US011375718B2

(12) United States Patent
Yang et al.

(10) Patent No.: US 11,375,718 B2
(45) Date of Patent: Jul. 5, 2022

(54) USE OF PRODIGIOSIN IN RESISTING POTYVIRUS

(71) Applicants: Tobacco Research Inst. of Chi. Acad. of Agr. Sci., Qingdao (CN); Sichuan Branch of China Tobacco, Chengdu (CN); Liangshan Branch of Sichuan Tobacco, Xichang (CN)

(72) Inventors: Jinguang Yang, Qingdao (CN); Fenglong Wang, Qingdao (CN); Xiang Xu, Qingdao (CN); Ying Li, Qingdao (CN); Liyun Song, Qingdao (CN); Lili Shen, Qingdao (CN); Qiang Lei, Chengdu (CN); Changchun Feng, Chengdu (CN); Bin Li, Chengdu (CN); Yong Wang, Xichang (CN); Dongyang Liu, Xichang (CN); Lianqiang Jiang, Xichang (CN)

(73) Assignees: Liangshan Branch of Sichuan Tobacco, Xichang (CN); Sichuan Branch of China Tobacco, Chengdu (CN); Tobacco Resarch Inst. of Chi. Acad. of Agr. Sci, Qingdao (CN)

( * ) Notice: Subject to any disclaimer, the term of this patent is extended or adjusted under 35 U.S.C. 154(b) by 160 days.

(21) Appl. No.: 16/948,646

(22) Filed: Sep. 25, 2020

(65) Prior Publication Data

US 2021/0400965 A1 Dec. 30, 2021

(30) Foreign Application Priority Data

Jun. 29, 2020 (CN) ........................ 202010608056.0

(51) Int. Cl.
*A01N 43/36* (2006.01)
*A01P 21/00* (2006.01)

(52) U.S. Cl.
CPC .................................. *A01N 43/36* (2013.01)

(58) Field of Classification Search
CPC ................................ A01N 43/36; A01P 21/00
See application file for complete search history.

(56) References Cited

FOREIGN PATENT DOCUMENTS

| | | |
|---|---|---|
| CN | 103387529 A | 11/2013 |
| CN | 103690534 A | 4/2014 |

(Continued)

OTHER PUBLICATIONS

Asano et al, Prodigiosin Produced by Serratia marcescens Enhances the Insecticidal Activity of Bacillus thuringiensis delta-Endotoxin ( Cry1C) against Common Cutworm, *Spodoptera litura*, 1999, J. Pesticide Sci., 24, pp. 381-385. (Year: 1999).*

*Primary Examiner* — Trevor Love

(57) ABSTRACT

The present invention belongs to the technical field of application of microbial secondary metabolites, and particularly relates to novel use of prodigiosin in resisting potato virus Y. Application of prodigiosin in preparing a medicine for preventing and controlling potato virus Y. The medicine for preventing and controlling the potyvirus is a liquid or solid preparation containing prodigiosin. It is clarified that PVY promotes its own replication and infection by recruiting host factor Hsp70 in the process of infecting the host, realizing virus infection and spread. Hsp70 plays an important role in the infection and replication of plant viruses. Based on the above results, it is further clarified that prodigiosin treatment can significantly increase the ubiquitination level of the plant host, promote the ubiquitination of HSP70 protein of the host, degrade or inhibit the expression of Hsp70 protein, activate the natural immune activity of the host plant.

5 Claims, 9 Drawing Sheets

(56) References Cited

FOREIGN PATENT DOCUMENTS

| | | | |
|---|---|---|---|
| CN | 106982839 | A | 7/2017 |
| CN | 111990404 | A | 11/2020 |
| JP | S53124684 | A | 10/1978 |

* cited by examiner

USE OF PRODIGIOSIN IN RESISTING POTYVIRUS

CROSS-REFERENCE TO RELATED APPLICATIONS

The application claims priority to Chinese patent application No. 202010608056.0, filed on Jun. 29, 2020, the entire contents of which are incorporated herein by reference.

TECHNICAL FIELD

The disclosure belongs to the technical field of application of microbial secondary metabolites, and particularly relates to a new application of prodigiosin in resisting potato Y virus PVY.

BACKGROUND

As the largest genus of plant virus, potato virus Y (PVY) is a virus which seriously harm solanaceous crops.

Potato virus Y (PVY) has a wide host ranges and is widely distributed all over the world, with a tendency to increase year by year. The yield and quality of plants infected by PVY would decrease, causing huge economic losses.

PVY is a representative specie of Potyvirus of Potyviridae. As the largest plant virus genus, Potyvirus has about 200 confirmed and tentative species, and more than 30% of the known plant viruses belong to Potyvirus, including PVY, Turnip mosaic virus (Tu MV), Soybean mosaic virus (SMV), Plum pox virus (PPV) and many other viruses that are of great significance in agriculture.

PVY was firstly discovered on potatoes and can infect many plants, especially Solanaceae, followed by Chenopodiaceae and legumes. The wide range of hosts has created powerful conditions for the epidemic of PVY, making it the most common and destructive virus that harms tobacco, potatoes and other crops. Plants infected with PVY often show symptoms such as mosaics, open veins, dwarfing, deformed leaves, and bad fruits. According to statistics, PVY can reduce potato production by up to 90%. PVY can infect tobacco systemically. After infecting different strains of PVYs, tobacco will produce different symptoms. According to the characteristics of symptoms, they can be divided into three types: mosaicism, disease of vein necrosis, and dotted streaky disease, and correspondingly, PVYs are also divided into ordinary strains (PVYO), vein necrosis strains (PVYN), and dotted streaky strains (PVYC).

Prodigiosins (PGs) are a class of compounds containing the prodigiosin (PG) tripyrrole skeleton and have a wide range of biological activities, such as anti-bacterial, immunosuppressive, anti-tumor, and anti-virus. In 1978, Fullan N P et. al reported the anti-tumor effect of PG in vivo. Since then, the application of PG and its derivatives in anti-tumor research has received continuous attention. Representative compounds include UP, GX15-070, mcPG, etc. Among them, GX15-070 is currently the only PGs that has entered phase III clinical trials and is expected to become a new anti-cancer drug. However, the neurotoxicity caused by high dose limits its independent clinical use to a certain extent. In addition, PGs have potential applications in food, medicine and other industries.

Application number 201310323749.5, the title of the which is "Anti-TMV tripyrrole ring compound and preparation method and use thereof", discloses a prodigiosin preparation specifically for TMV; this compound can not only make TMV passivation, making TMV lose its infective activity, and it can also induce the host to produce systemic resistance, alleviate and weaken the appearance and occurrence of symptoms of plants infected with TMV, and the control effect of TMV can reach more than 70%. However, the existing literature has not reported that prodigiosin can resist PVY virus, and the anti-plant virus mechanism is unclear.

SUMMARY

Aiming at the defects of the prior art, the present disclosure provides novel use of prodigiosin in resisting potato virus Y (PVY).

The present disclosure is realized by the following technical scheme: novel use of prodigiosin in resisting PVY.

An application of prodigiosin in preparing a medicine for preventing and controlling PVY.

The prodigiosin is a secondary metabolite of *Serratia marcescen.*

The medicine for preventing and controlling PVY is a liquid or solid preparation containing prodigiosin.

Preferably: the medicine for preventing and controlling PVY is a liquid preparation containing prodigiosin at a concentration of 0.05 μg/L, and is uniformly applied on leaf surfaces of a plant infected with potato virus Y according to 15 L/mu.

The prodigiosin treats plants infected with PVY, promotes the ubiquitination of the HSP70 protein of the host plant, degrades or inhibits the expression of the Hsp70 protein, activates the natural immune activity of the host plant, and induces the plant host to generate systemic resistance.

The prodigiosin disclosed by the disclosure is the prodigiosin obtained in the application number 201310323749.5 titled with "tripyrrole ring compound resisting TMV and preparation method and use thereof".

According to the disclosure, the quantitative proteome and ubiquitinated nonstandard quantitative omics in tobacco leaves are researched by taking prodigiosin, PVY and tobacco as main research materials and organically combining a series of advance technologies such as a nonstandard quantitative technology, a high performance liquid chromatography grading technology, an ubiquitinated peptide segment enrichment technology, a quantitative proteomics technology based on mass spectrometry and the like. The combined analysis of proteome and ubiquitination omics showed that the protein level of Heat shock 70 kDa protein is significantly down-regulated after the prodigiosin S3 treatment, but on the contrary, the ubiquitination level of the protein is significantly up-regulated. It is suggested that ubiquitination modification of Hsp70 plays an important role in the mechanism of prodigiosin S3-induced resistance. Western blot is used to verify the authenticity of this omics data. The results show that the overall ubiquitination level of *Nicotiana benthamiana* increases after the prodigiosin S3 treatment, while the level of Hsp70 protein in the host decreases, consistent with the results of the omics analysis, indicating that the omics data is credible, and prodigiosin S3 treated plants can inhibit the expression of Hsp70 protein in the host.

The effects of PVY infection on Hsp70 are analyzed by qRT-PCR, Western blot and other technologies. The results show that PVY infection would cause the up-regulation of Hsp70 mRNA and protein levels in the host. Furthermore, virus-induced gene silencing (VIGS), transient overexpression and other methods were used to prove that Hsp70 plays an important role in plant growth and development, and Hsp70 plays an important role in PVY infection and replication.

Ubiquitination inhibitor MG-132 is used to inhibit the ubiquitination modification in the host, and the role of ubiquitination in the mechanism of prodigalin resisting viral diseases is explored. The results show that the induced resistance of prodigalin is achieved by inhibiting the expression of Hsp70 protein to realize the antiviral effect. Inhibition of host ubiquitination modification level then inhibits the virus resistance of prodigiosin mediated by Hsp70, suggesting that ubiquitination of Hsp70 may play an important role in the mechanism of virus resistance of prodigiosin S3.

The present disclosure clarifies that PVY promotes its own replication and infection by recruiting host factor Hsp70 in the process of infecting the host, realizing virus infection and spread. Hsp70 plays an important role in the infection and replication of plant viruses. Based on the above results, it is further clarified that prodigiosin treatment can significantly increase the ubiquitination level of the plant host, promote the ubiquitination of HSP70 protein of the host, degrade or inhibit the expression of Hsp70 protein, activate the natural immune activity of the host plant, induce the plant host to generate a systemic resistance and achieve antiviral characteristics.

DETAILED DESCRIPTION OF THE EMBODIMENTS

Figure 1:
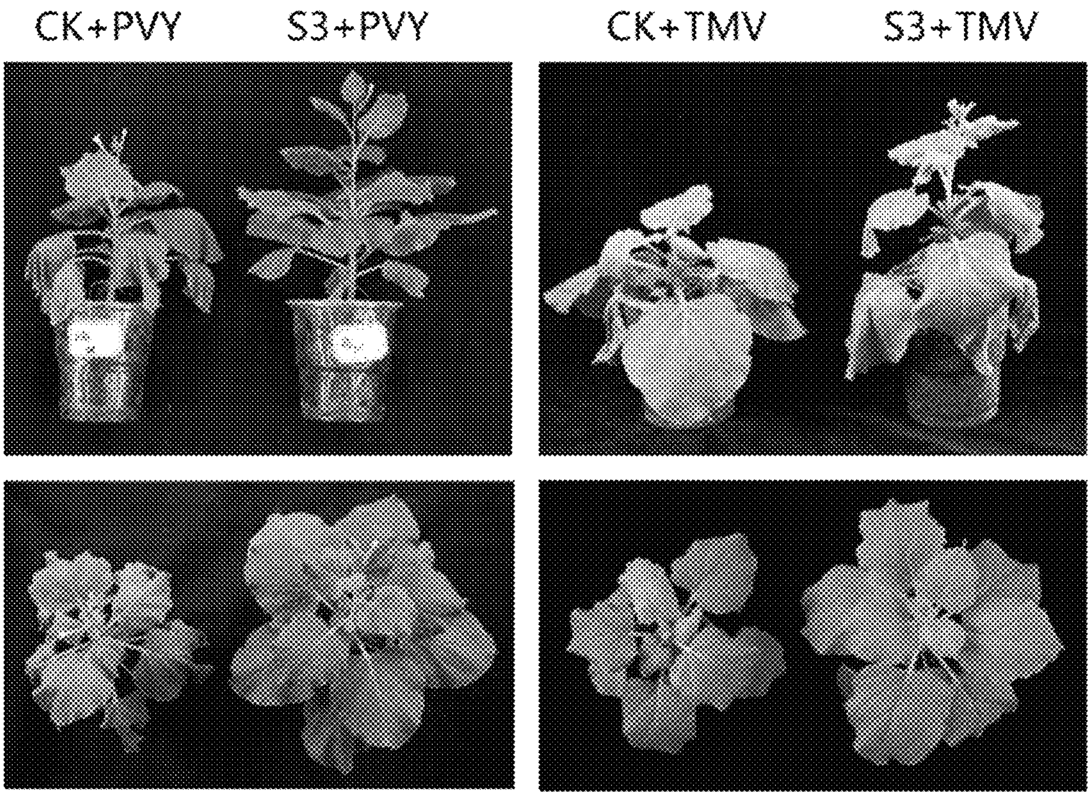
FIG. 1 is an experimental diagram of an inhibitory response of prodigalin-treated tobacco to PVY and TMV infection and replication; in this figure, from left to right, PVY-infected tobacco control group, prodigalin S3 and PVY-infected tobacco treatment group, TMV infected tobacco control group, prodigalin S3 and TMV infected tobacco treatment group are shown respectively.

In the previous work, a strain of bacteria with induced resistance to TMV and PVY was isolated from tobacco rhizosphere soil in Shanxi Province, which was identified as *Serratia marcescen* by 16S rRNA and Biolog Microplate. An S3 matter, a secondary metabolite with tripyrrole ring structure, was isolated from a fermentation broth of *Serratia marcescen* by isolation, identification and virus biological assay. This matter plays a decisive role on the induced resistance of host plants. In order to further clarify its mechanism of action, the Hsp70 protein was screened through the combined analysis of proteomics and ubiquitination omics, and it is speculated that the ubiquitination modification of the protein may play an important role in the mechanism of antiviral induced resistance of prodigalin S3. This study hopes to use a variety of biochemical and molecular biology methods to further reveal the mechanism of host Hsp70 protein ubiquitination modification in the induced resistance of prodigalin S3. The main results are as follows:

(1) The prodigiosin is a tripyrrole ring metabolite derived from bacteria, has a natural immune activation effect, and the induced resistance to TMV and PVY can reach 100% through infiltration treatment. The quantitative proteome and ubiquitinated nonstandard quantitative omics in tobacco leaves are researched by taking prodigiosin, PVY and tobacco as main research materials and organically combining a series of advance technologies such as a nonstandard quantitative technology, a high performance liquid chromatography grading technology, an ubiquitinated peptide segment enrichment technology, a quantitative proteomics technology based on mass spectrometry and the like. It is seen from the combined analysis of proteome and ubiquitination omics that the protein level of Heat shock 70 kDa protein is significantly down-regulated after a prodigiosin S3 treatment, but on the contrary, the ubiquitination level of the protein is significantly up-regulated. It is suggested that ubiquitination modification of Hsp70 plays an important role in the mechanism of prodigiosin S3-induced resistance. Western blot is used to verify the authenticity of this omics data. The results show that the overall ubiquitination level of *Nicotiana benthamiana* increases after the treatment of prodigiosin S3, while the level of Hsp70 protein in the host decreases, consistent with the results of the omics analysis, indicating that the omics data is credible, and prodigiosin S3 treated plants can inhibit the expression of Hsp70 protein in the host.

(2) The effect of PVY infection on Hsp70 is analyzed by qRT-PCR, Western blot and other technologies. The results show that PVY infection can cause the up-regulation of Hsp70 mRNA and protein levels in the host. Furthermore, virus-induced gene silencing (VIGS), transient overexpression and other methods are used to prove that Hsp70 plays an important role in plant growth and development, and Hsp70 plays an important role in PVY infection and replication.

(3) Ubiquitination inhibitor MG-132 is used to inhibit the ubiquitination modification in the host, and the role of ubiquitination in the mechanism of prodigalin S3 resisting viral diseases is explored. The results show that the induced resistance of prodigalin S3 is achieved by inhibiting the expression of Hsp70 protein to realize the antiviral effect. Inhibition of host ubiquitination modification level then inhibits the virus resistance of prodigiosin S3 mediated by Hsp70, suggesting that ubiquitination of Hsp70 may play an important role in the mechanism of virus resistance of prodigiosin S3.

According to the above results, it is concluded that: this study clarifies that PVY promotes its own replication and infection by recruiting host factor Hsp70 in the process of infecting the host, realizing virus infection and spread. Hsp70 plays an important role in the infection and replication of plant viruses. Based on the above results, it was further confirmed that clarified S3 treatment can significantly increase the ubiquitination level of the plant host, promote the ubiquitination of HSP70 protein of the host, degrade or inhibit the expression of Hsp70 protein, activate the natural immune activity of the host plant, induce the plant host to generate a systemic resistance and achieve antiviral characteristics.

The technical solutions in the examples of the present disclosure will be described below clearly and completely. Obviously, the described examples are only a part of the examples of the present disclosure, rather than all of the examples. Based on the examples of the present disclosure, all other examples obtained by a person of ordinary skill in the art without involving any inventive effort are within the scope of the present disclosure.

Example 1: Transcriptomics and Proteomic Analysis of Tobacco Induced by Prodigiosin The plant material used in this experiment was *Nicotiana tabacum* cv. NC89, reproduced by our laboratory and cultivated in a greenhouse. Experimental plant culture conditions included: illumination 16 h, temperature 25±1° C., illumination intensity 2000 lux and relative humidity 60%; and dark duration 8 h, temperature 25±1° C. and relative humidity 60%. The nutrient substrate was produced by the Wode nutrient soil processing plant in Shouguang City, Shandong Province, and no additional fertilization was needed during plant growth. The sources of TMV and PVY were preserved by the Plant Protection Research Center of the Institute of Tobacco Research of CAAC (Chinese Academy of Agricultural Sciences), and were propagated and preserved on *Nicotiana tabacum* cv. NC89 grown in the greenhouse. The prodigiosin S3 was isolated and purified from *Serratia marcescens* fermentation broth by Plant Protection Research Center of the Institute of Tobacco Research of CAAC.

Experimental Results:

1. Bioactivity of prodigiosin: as shown in FIG. 1, 0.05 μg/L prodigiosin was uniformly applied on tobacco leaf surfaces according to 15 L/mu, 48 h later, TMV and PVY were inoculated respectively; and the virus biological characteristics of TMV and PVY were observed 14 d after inoculation. The results showed that prodigiosin can induce the host to generate systemic resistance, inhibit infection and replication of TMV and PVY in the host, weaken virus-specific symptoms and improve disease resistance of the host; after the tobacco was treated with prodigiosin (0.05 μg/L), the resistance of the treated plants to virus was significantly enhanced. After 7 days of treatment, TMV and PVY were inoculated, the symptoms of viral disease were not obvious, but the control group had obvious mosaic disease and leaf deformity. This indicated that prodigiosin S3 treatment can increase plant resistances to TMV and PVY viral diseases.

Example 2: Proteomics and Ubiquitination Omics Analysis of Prodigiosin-Induced Tobacco In order to further understand the mechanism of systemic resistance of a plant induced by prodigiosin, the prodigiosin treated *Nicotiana benthamiana* was used as a target material, the optimal reaction time point of prodigiosin against PVY was selected, and the quantitative proteomics and ubiquitinated nonstandard quantitative proteomics in tobacco leaves were studied by organically combining a series of advanced technologies such as non-standard quantitative technology, high performance liquid chromatography (HPLC) fractionation technology, ubiquitinated peptide enrichment technology and quantitative proteomics technology based on mass spectrometry.

Extraction of protein. The leaf sample was taken from −80° C., put in a mortar precooled with liquid nitrogen, fed with liquid nitrogen, and fully ground to powder; 4 times the volume of powdered lysis buffer (8 M urea, 1% TritonX-100, 10 mM DTT, 1% protease inhibitor and 50 μM PR-619) was added for ultrasonic lysis; followed by 10 min of centrifugation (4° C., 20000 g), the supernatant was carefully aspirated off, and trichloroacetic acid was added to a final concentration of 20%; the mixture was left at 4° C. for 2 h; and centrifuged (4° C., 20000 g) for 3 min. The supernatant was discharged, and the precipitate was washed with precooled acetone for three times; the precipitate was re-dissolved (8 M urea) and the protein concentration was determined.

Proteolysis. DTT was added to the protein solution to a final concentration of 5 mM and was reduced at 56° C. for 30 min. Iodoacetamide was then added and incubated for 15 min at room temperature away from light. Pancreatin was added based on a mass ratio of pancreatin:protein=1:50 and enzymolysis was performed at 37° C. overnight. Pancreatin was added again based on a mass ratio of pancreatin: protein=1:100 and enzymolysis was continued for 4 h.

HPLC Fractionation. The enzymatic solution was fractionated by high pH reverse phase HPLC on an Agilent 300 Extend C18 (5 μm particle size, 4.6 mm internal diameter, 250 mm length) column. The operation was as follows: a peptide fragment grading gradient was 8%-32% acetonitrile, the pH was 9; 60 components were separated in 60 min, then the components were combined into 4 components, and the combined components were subjected to lyophilization for subsequent operations.

HPLC-MS Analysis. The lyophilized fractions were analyzed by HPLC-MS: dissolved by a mobile phase A phase (0.1% (v/v) formic acid in water) and separated using EASY-nLC 1000 ultra high performance liquid phase system. Mobile phase A was an aqueous solution containing 0.1% formic acid and 2% acetonitrile; mobile phase B was an aqueous solution containing 0.1% formic acid and 90% acetonitrile; mobile phase B is set as: 0-42 min, 5%-25% B; 42-52 min, 25%-38% B; 52-56 min, 38%-80% B; 56-60 min, 80% B; and the flow rate was maintained at 350 nL/min.

Database Search. Secondary mass spectral data was retrieved using Maxquant (v 1.5.2.8). The cysteine alkylation was set as a fixed modification, and the variable modification included the oxidation of methionine and the acetylation of the N-terminus of the protein. Data Analysis. Differential genes and proteins were analyzed by GO enrichment, and KEGG pathway.

Figure 2:
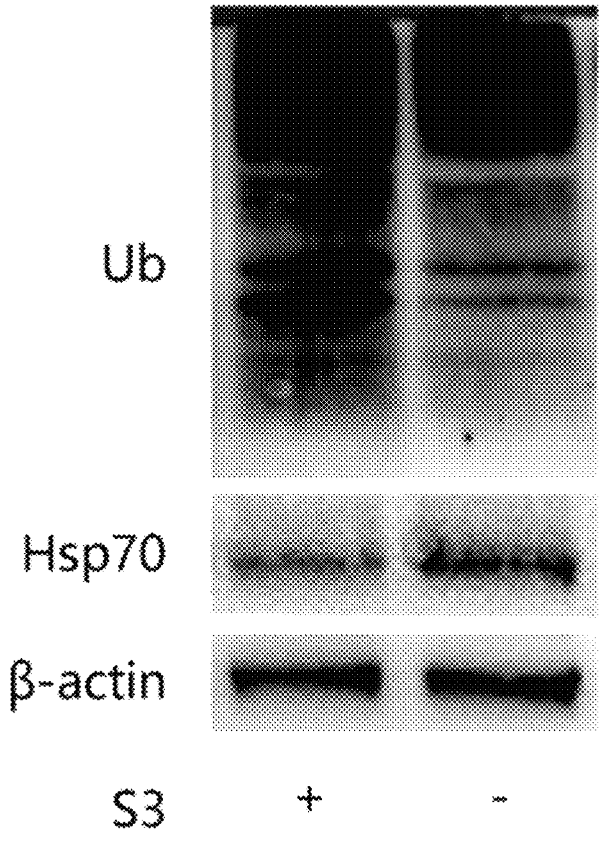
FIG. 2 shows the regulation effects of Prodigiosin S3 on the ubiquitination level of tobacco host protein and the expression of HSP70 protein.

As shown in FIG. 2, the results show that 6122 proteins are identified in the proteome, expression of 223 proteins is up-regulated and expression of 186 proteins is down-regulated in the S3 treatment group compared with the control group ($p<0.05$); 2031 ubiquitination sites located on 1110 proteins are identified in the ubiquitination omics; and modification level of 33 sites is up-regulated and modification level of 21 sites is down-regulated in the S3 treatment group compared with the control group ($p<0.05$). The combined analysis of proteome and ubiquitination omics showed that the protein level of Heat shock 70 kDa protein is significantly down-regulated after S3 treatment, on the contrary, the ubiquitination level of the protein is significantly up-regulated.

Heat shock protein (HSP) is an important molecular chaperone in plant cells, and is highly conserved in evolution. Hsp70 is induced to express when stressed by environmental factors so as to cope with the threat of external harsh environmental conditions. The protein is widely distributed in prokaryotic and eukaryotic cells, and is an important functional protein for maintaining life activities. It has multiple biological functions: assisting the folding of the nascent protein, involving in the transport of intracellular proteins, involving in the travel and decomposition of immune complexes and degrading redundant proteins. Many studies have shown that Hsp70 protein family plays an important role in the replication of several viruses, Hsp70 protein as a permanent component of a virus replication complex (VRC) of tomato bushy stunt virus (TBSV) has been proved by proteomics analysis. Therefore, we suspect that Hsp70 can play a very important role in the resistance of *Serratia marcescens* S3-induced plants to viral diseases, and further suppose that the resistance may be caused by the ubiquitination of host Hsp70 protein after S3 treatment.

Example 3: Effect of Prodigiosin Treatment on Ubiquitination Modification and Host Factor Hsp70 Protein In order to further confirm the changes of ubiquitination and expression level of Hsp70 protein in the prodigiosin-treated plants, the changes of Hsp70 protein level and total ubiquitination level in the prodigiosin S3-treated *Nicotiana benthamiana* were detected by Western blot.

Figure 8:
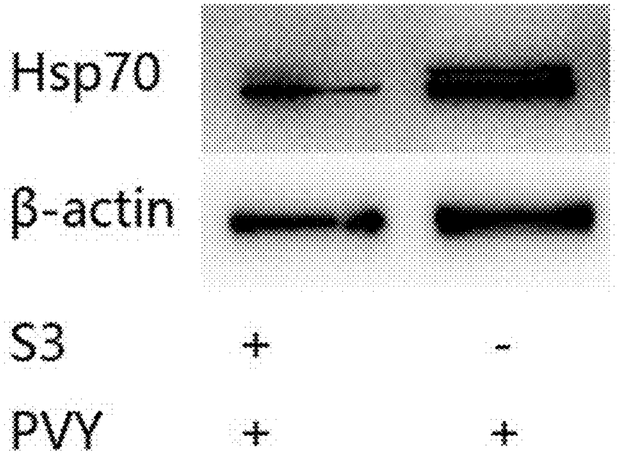
FIG. 8 shows the effect of prodigiosin S3 treatment on changes of the host HSP70 protein expression in tobacco plants.

Results are as shown in FIG. 8, indicating that the overall ubiquitination level is increased in the prodigiosin S3-treated *Nicotiana benthamiana*, the Ub ubiquitinated protein in the prodigiosin S3 treated group; at the same time, the level of Hsp70 protein in the host decreases. This is consistent with the results of the omics analysis, indicating that the omics data is credible, and the prodigiosin S3 treated plant can inhibit the expression of Hsp70 protein in the host. Prodigiosin-treated tobacco can significantly increase the ubiquitination of the host protein, while prodigiosin S3-treated tobacco can significantly reduce the expression of Hsp70 protein.

Example 4: Role of Hsp70 Protein in PVY Infection Process

The tested plant material was *Nicotiana benthamiana*. Seeds of *Nicotiana benthamiana* were planted in a mixed soil (soil:peat=1:1), cultured in an artificial climate chamber at 25° C. with a photoperiod of 14 h light/10 h dark and a relative humidity of 70%, and 5-6 leaf stage tobacco seedlings were used for the test. The PVY virus source is N strain preserved by the Institute of Tobacco Research of CAAC. 1 G of leaves of a PVY wild type virus source plant were taken, put into a mortar sterilized and disinfected in advance, added with 40 mL of PBS buffer solution, and ground into a slurry; and the slurry was filtered with gauze to remove leaf residues to obtain suspension liquid for later use; PVY virus juice was infiltrated into the 3-4$^{th}$ true leaves of *Nicotiana benthamiana* seedlings (4 weeks), with 200 μL per leaf. PVY-GFP is an infectious clone of PVY necrotic strain (PVYN). A SacII restriction endonuclease site is inserted between P1 and HC-pro of the PVY infectious clone by nonsense mutation, and a recombinant virus expressing exogenous green fluorescent protein (GFP) was inserted into this site. The virus can infect *Nicotiana benthamiana* systemically, expand to the non-inoculation site of the plant and show fluorescence.

Subcellular Localization of NbHsc70-2 by Laser Confocal Microscopy. A specific primer NbHsc70-2-XbaI F/KpnI R with XbaI/KpnI restriction enzyme cutting site without stop codon was designed according to the sequence of NbHsc70-2, and then PCR amplification was carried out by using cDNA of *Nicotiana benthamiana* as a template, and the product was linked with Fu46 vector by In-Fusion technology (TaKaRa) to construct NbHsc70-2::RFP fusion gene, and the fusion gene was linked to pEarleyGate 100 vector by using an LR homologous recombination technology (Invitrogen) to finally obtain pEarleyGate 100::NbHsc70-2::RFP vector; *Agrobacterium tumefaciens* LBA4404 (OD 600=0.8) containing pEarleyGate100::NbHsc70-2::RFP vector and pEarleyGate100::RFP vector was used to infiltrate the lower epidermis of *Nicotiana benthamiana* and cultured in the artificial climate chamber at 25° C. with a photoperiod of 14 h light/10 h dark and a relative humidity of 70%. After 72 h, the slide was made and placed under a laser confocal microscope (SP8, Leica) to observe the expression in bright and dark fields.

Construction of NbHsc70-2 Transient Overexpression Vector. A specific primer NbHsc70-2-AhdI F/R (Table 1) containing an AhdI restriction enzyme cutting site was designed according to the sequence of NbHsc70-2 gene, and then PCR amplification was carried out by using cDNA of *Nicotiana benthamiana* as a template, and the product was linked with GWC vector by In-Fusion technology (TaKaRa) to construct GWC::NbHsc70-2 entry vector, and the entry vector was linked to pEarleyGate 100 vector by using an LR homologous recombination principle (Invitrogen) to finally obtain pEarleyGate100::GWC::NbHsc70-2 expression vector; *Nicotiana benthamiana* was infiltrated with the PVY disease juice 24 hours in advance, and *Agrobacterium tumefaciens* LBA4404 (OD 600=0.8) containing pEarleyGate100::GWC::NbHsc70-2 expression vector and pEarleyGate100::GWC vector was used to infiltrate the lower epidermis of *Nicotiana benthamiana*. After 48 h, sampling was started to detect the accumulation of PVY CP gene.

QRT-PCR and Statistical Analysis. Fluorescent quantitative detection primers for each gene were designed according to the gene sequences of specific genes in different samples (Table 1), while Actin was set as an internal reference. The total RNAs (TaKaRa) of the materials in the treatment group and the control group at each sampling time point were extracted, and reverse transcribed into cDNA (Vazyme). Using cDNA as template, amplification was performed on an Applied Biosystems 7500 real-time PCR model according to the ChamQ™ Universal SYBR® qPCR Master Mix (Vazyme) kit instructions. Reaction system: 10

μL 2× ChamQ Universal SYBR qPCR Master Mix, 0.4 μL Primer1 (10 μmol·L−1), 0.4 μL Primer2 (10 μmol·L−1), 2 μL cDNA, making up to a total volume of 20 μL with distilled water. Reaction procedure: 95° C. 30 s; 95° C. 5 s; 60° C. 30 s; 40 cycles; 95° C. 15 s; 60° C. 1 min, and 95° C. 15 s. Relative expression levels were calculated using the 2−ΔΔCt method [17-18], data statistical analysis was performed using 7500 Software v 2.3 and plotted using GraphPad Prism 6.0. P<0.05 means significant difference, and P<0.01 means very significant difference.

Results and Analysis:

1. PVY Infection Causes Up-Regulation of Hsp70 mRNA and Protein Levels

Figure 3:
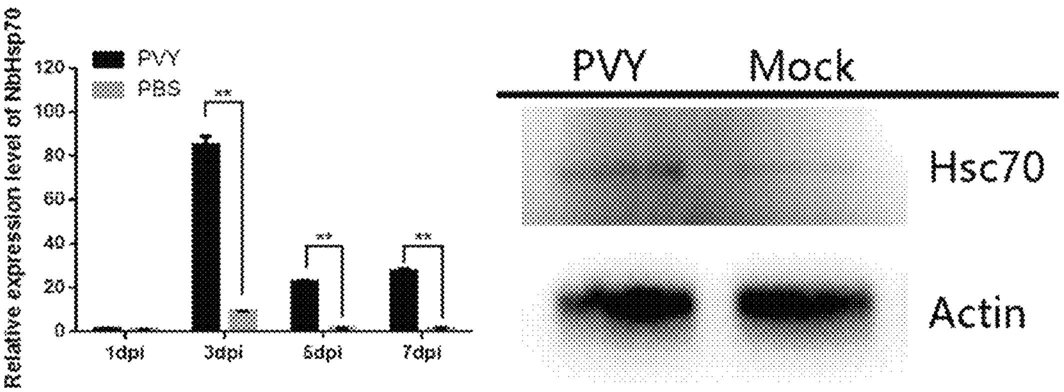
FIG. 3 shows the effect of PVY-infected tobacco on the change of host HSP70 protein expression.

In order to study whether the host Hsp70 was infected by PVY, we used the virus source of PVY N strain preserved in laboratory to inoculate mechanically *Nicotiana benthamiana*, collected the inoculated leaves infected by PVY for 1 d, 3 d, 5 d and 7 d, and analyzed by qRT-PCR. The results are shown in FIG. 3, showing that the Hsp70 mRNA level increases sharply 3 d after PVY infection, and decreases 5 d and 7 d after PVY infection compared with 3 d, but still higher than the control group. The results show that PVY infection can increase the Hsp70 mRNA level in the host.

The samples of *Nicotiana benthamiana* infected with PVY for 3 d were selected, and Western blot was used to analyze the effect of PVY infection on Hsp70 protein from the protein level. The results show that Hsp70 protein level is up-regulated 3 d after PVY treatment, consistent with the detection of RNA level. In summary, the results show that PVY infection can cause the up-regulation of Hsp70 mRNA and protein in the host. The PVY virus-infected host can significantly increase the expression of HSP70.

Example 5: Effect of Silencing NbHsp70 on PVY Replication

Figure 4:
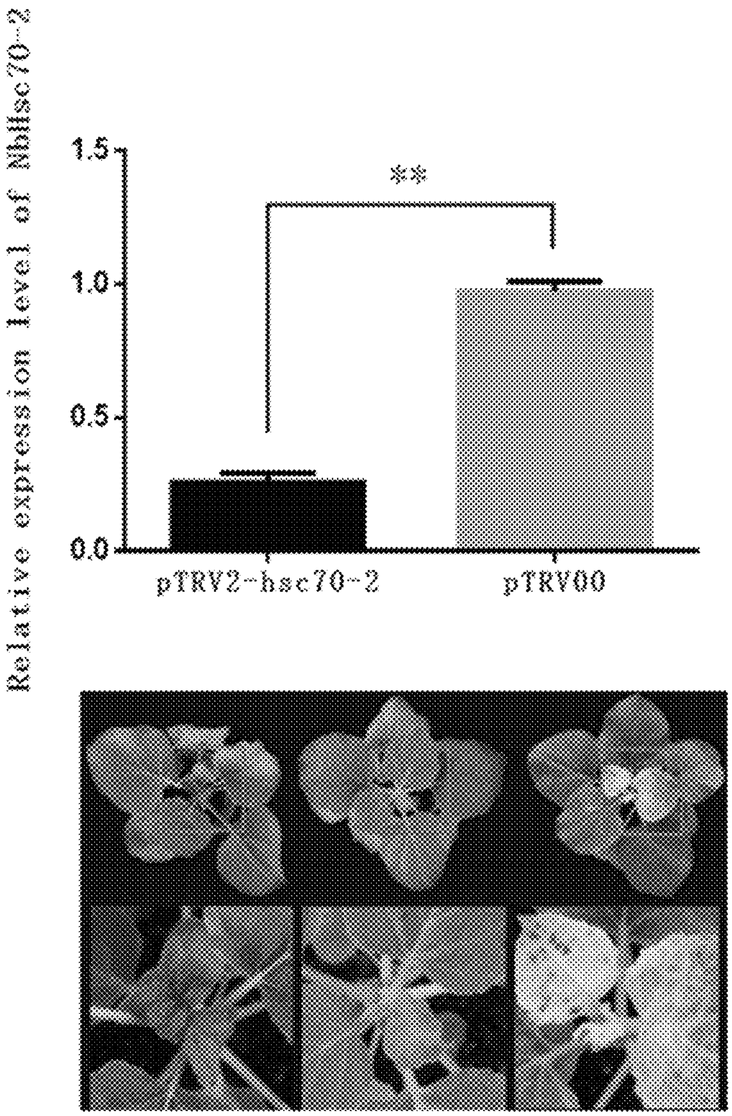
FIG. 4 shows silencing efficiency and plant phenotype after silencing NbHsp70 gene, note: error bars representing the positive and negative standard deviations of three biological replicates, and each replicate counting at least 20 *Nicotiana benthamiana*. T-test is used to calculate the significance of the difference relative to the negative control; **, p<0.01.

In order to further study the function of Hsp70 protein in PVY-infected *Nicotiana benthamiana*, we constructed a VIGS silencing system to down-regulate the content of NbHsp70 gene in *Nicotiana benthamiana* by virus-induced gene silencing technology, and analyzed the effect of reducing the content of NbHsp70 gene in the host on PVY-infected *Nicotiana benthamiana*. The silencing efficiency is 67.50±0.29% (n=30) 7 d after *Nicotiana benthamiana* was infiltrated by *Agrobacterium* (FIG. 4). As can be seen from FIG. 4, silencing NbHsp70 can result in plant shrinkage and dwarfing, suggesting that Hsp70 protein may be involved in regulating plant growth and development.

Plant material and laser confocal microscope observation were the same as those in Example 4. Construction of NbHsc70-2 Silencing Vector. A pair of specific primers RNAi NbHsc70-2 F/R (Table 1) containing restriction endonucleases EcoRI and KpnI were designed by Premier 5.0 according to the sequence of NbHsc70-2 gene. A silencing fragment of 350 bp in size was amplified by PCR, and the product was linked with pTRV2 vector by In-Fusion technology (TaKaRa) to construct pTRV::NbHsc70-2 recombinant vector; and *Agrobacterium tumefaciens* LBA4404 (OD 600=0.8) containing pTRV::NbHsc70-2 vector, pTRV::PDS and pTRV00 null vector was used to infiltrate the lower epidermis of *Nicotiana benthamiana*. The silencing efficiency was tested 7 days later, and the follow-up test was performed.

7 D after the host plant was infiltrated by TRV, the virus PVY-GFP was inoculated to the $3^{th}$ leaf on the upper side of the TRV infiltrated leaves, and 7 d after inoculation, the green fluorescence condition of the *Nicotiana benthamiana* was observed under a portable ultraviolet lamp; infection with the PVY-GFP system in the TRV control group can cause fluoresce in the non-inoculated leaves, where as there is no significant green fluorescence in the NbHsp70 silencing group (FIG. 5), and the number of fluorescent spots is about 0.28 times that of the control group. This indicates that the decreased mRNA content of NbHsp70 in the host plant results in the inhibition of PVY-GFP systemic infection.

In order to further clarify down-regulation of NbHsp70 gene expression can inhibit PVY to infect *Nicotiana benthamiana*, $PVY^N$ was inoculated by infiltration:: 7 d after inoculation with pTRV::NbHsp70, and the relative accumulation of PVYN was detected from RNA and protein levels.

Figure 5:
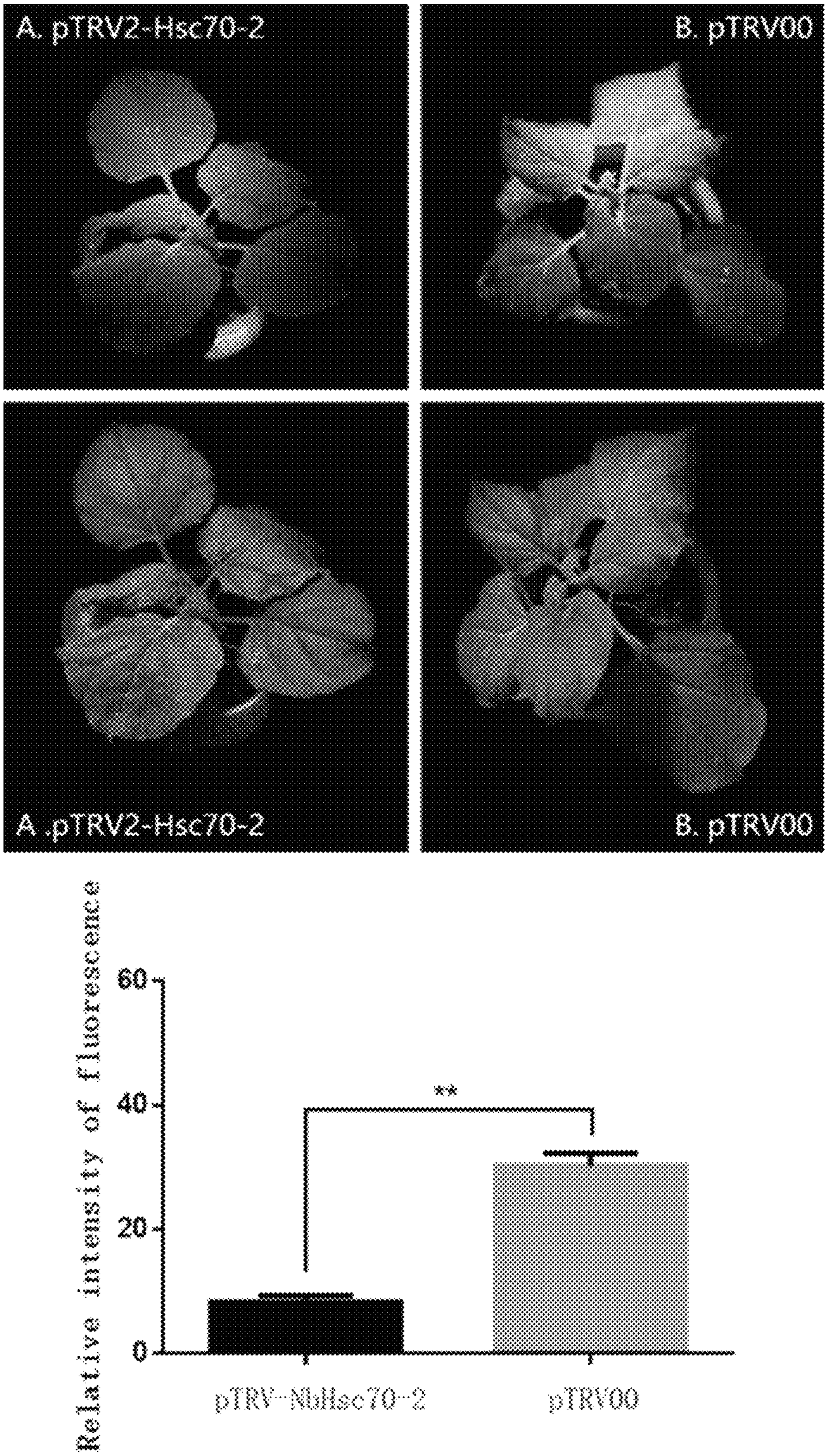
FIG. 5 shows the comparation of the cumulative amounts of green fluorescent protein GFP-labeled PVY in NbHsc70-2 silencing and control groups, with error bars representing the positive and negative standard deviations of three biological replicates, each replicate counting at least 20 *Nicotiana benthamiana*. T-test is used to calculate the significance of the difference relative to the negative control; **, p<0.01.
Figure 6:
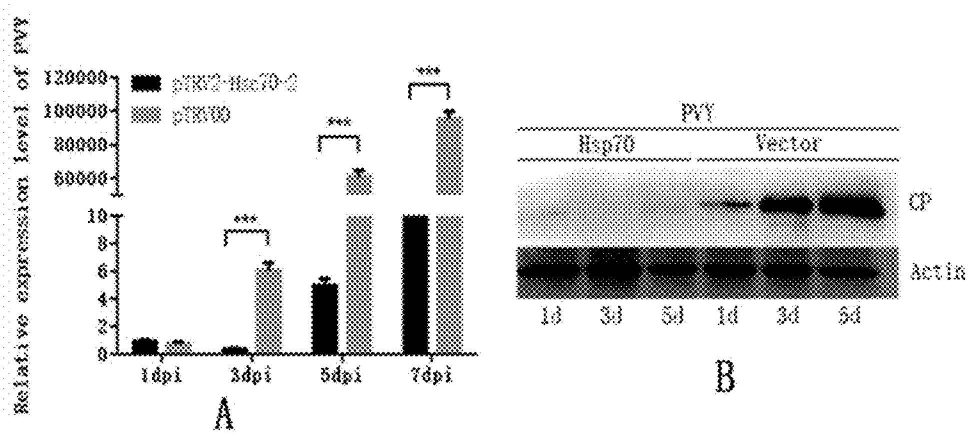
FIG. 6 shows the effect of silencing NbHsc70-2 gene on PVY accumulation; with error bars representing the positive and negative standard deviations of three biological replicates, and each replicate counting at least 20 *Nicotiana benthamiana*. T-test is used to calculate the significance of the difference relative to the negative control; ***, p<0.001.

It can be seen from FIG. 5 that the expression of PVY CP gene in silencing group and control group showed an increasing trend, but the increasing trend of silencing group was slower than that of control group; the expression of CP gene in silencing group is lower than that in control group 1 d after PVY inoculation; the expression level in silencing group is 0.14 times than that in control group for 3 d; the expression level in the silencing group is 0.00004 times higher than that in the control group for 5 d. This indicated that silencing NbHsp70 can significantly delay PVY CP mRNA accumulation in plants.

The accumulations of viral CP protein in leaves of the silencing group and control group were further analyzed by Western blot. It can be seen from the FIG. 5 that the gray values of CP protein in the silencing group are 55.90, 66.912 and 68.186 after PVY treatment for 1 d, 3 d and 5 d, respectively; the gray values of CP protein in control group are 120.24, 156.22 and 174.35, respectively. The CP protein content in the silencing group is significantly less than that in the control group, consistent with the detection of RNA level. In summary, the results showed that down-regulation of NbHsp70 content in the host can inhibit PVY infection and replication.

Example 6: Effect of NbHsp70 Overexpression on PVY Replication

In order to further determine the role of Hsp70 protein in host infection by PVY, we constructed a transient expression vector of NbHsp70 by recombination of constructed pGWC-NbHsp70 with pEarleyGate100 through LR reaction. The expression vector pEarleyGate100 overexpressed NbHsp70 in *Nicotiana benthamiana*, and increased the content of NbHsp70 in host. The viral accumulation of RNA and protein levels after PVY infection were analyzed.

Figure 7:
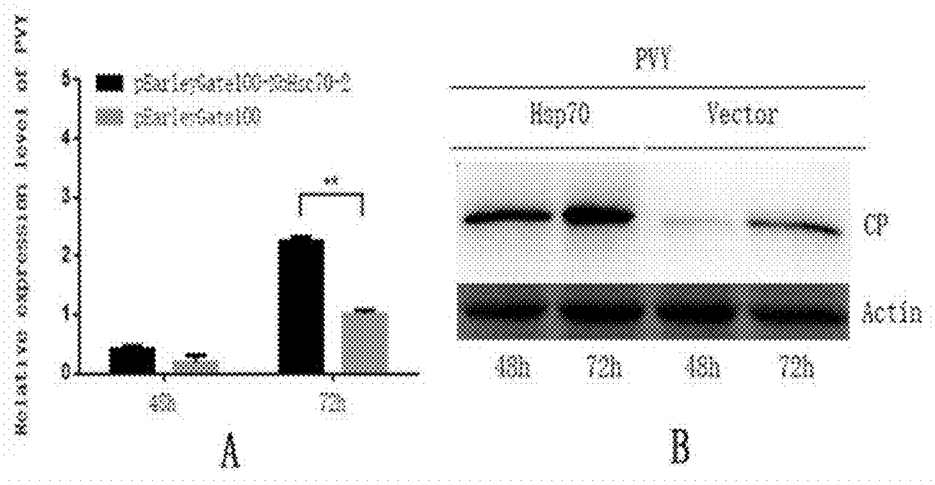
FIG. 7 shows the effect of overexpressing NbHsc70-2 gene on PVY accumulation; with error bars representing the positive and negative standard deviations of three biological replicates, and each replicate counting at least 20 *Nicotiana benthamiana*. T-test is used to calculate the significance of the difference relative to the negative control; **, p<0.01.

As shown in the left panel of FIG. 7, it can be seen that the expression level of PVY CP gene in the overexpression group is higher than that in the control group after 48 h of expression vector treatment, and the expression level in the overexpression group is 2.31 times that in the control group; and the expression of PVY CP in overexpression group is 2.56 times higher than that in control group after 72 h of treatment. The results show that overexpression of the content of NbHsp70 gene in the host can significantly increase the accumulation of PVY CP gene in the plant.

The accumulations of viral CP protein in the leaves of overexpression group and control group were further analyzed by Western blot. As shown in the right panel of FIG. 7, the gray values of CP protein in the overexpression group are 172.29 and 181.17 respectively after 48 h and 72 h of expression vector treatment; and the gray values of CP protein in the control group are 26.95 and 91.14, respectively. The CP protein content in the overexpression group is significantly higher than that in the control group, consistent with the detection results of RNA level. These results indicate that up-regulation of NbHsp70 content in the host can promote PVY infection and replication.

Example 7: The Role of Hsp70 and its Ubiquitination in Prodigiosin-Induced Resistance Plant material and laser confocal microscope observation were the same as those in Examples 3 and 4.

Results:

1. The role of Hsp70 in the viral disease resistance mechanism of prodigiosin S3: previous studies showed that prodigiosin S3 treatment results in the reduction of Hsp70 protein, and Hsp70 protein is also involved in the PVY virus infection process. however, Hsp70 protein has not been confirmed to play a key role in the antiviral mechanism of prodigiosin S3. Therefore, we use Western Blot to detect the content of Hsp70 protein in the *Nicotiana benthamiana* plant treated with prodigiosin S3 for 3 days and then inoculated with PVY virus for 3 days. The results show that the content of Hsp70 protein in the treated group is significantly lower than that in the control group. This indicates that the antiviral effect is achieved by inhibiting the expression of Hsp70 protein in the viral disease resistance mechanism of prodigiosin S3.

2. The role of ubiquitination modification in the viral disease resistance mechanism of prodigiosin S3: MG-132 is a polypeptide aldehyde that is also a potent, reversible, cell-permeable proteasome inhibitor with an IC50 value of 100 nM, effectively blocking the proteolytic activity of the 26S proteasome complex. That is, it is a chemical agent for inhibiting ubiquitination modification and has been widely used in the functional study of ubiquitination modification.

Western blot analysis show that the content of Hsp70 protein in the MG-132-treated samples induced by prodigiosin S3 increases significantly, indicating that MG-132 treatment can inhibit the down-regulation of Hsp70 protein induced by prodigiosin S3.

Figure 9:
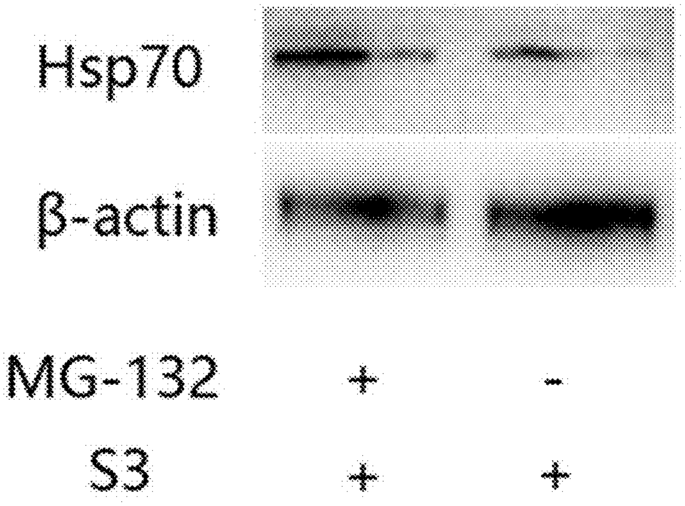
FIG. 9 shows that inhibition of host ubiquitination significantly reduces the level of ubiquitination of Hsp protein by prodigiosin S3.

In order to further analyze the role of ubiquitination modification in the antiviral mechanism of prodigiosin S3, we used MG-132 to treat *Nicotiana benthamiana* in advance. After 2 h, 0.05 μg/L prodigiosin was applied on the tobacco leaf surface uniformly according to 15 L/mu. After 30 minutes, TMV and PVY viruses were inoculated. The samples of 1 d, 2 d and 3 d after virus inoculation were collected for Western Blot analysis. Experimental results are as shown in FIG. 9, the results show that the accumulation of Hsp70 protein is significantly increased in MG-132 treated samples induced by prodigiosin S3 and inoculated with PVY virus for 1 d compared to the control group. The results show that inhibition of host ubiquitination significantly can reduce the ubiquitination level of prodigiosin S3 to Hsp protein, while inhibition of host ubiquitination modification level then inhibits the virus resistance of prodigiosin S3 mediated by Hsp70, suggesting that ubiquitination of Hsp70 may play an important role in the mechanism of virus resistance of prodigiosin S3.

What is claimed is:

1. A method of treating a potato plant infected with potato virus Y comprising applying a composition comprising prodigiosin to the potato plant infected with potato virus Y.

2. The method of claim 1, wherein the composition is in the form of a liquid or solid.

3. The method of claim 1, wherein the composition is in the form of a liquid.

4. The method of claim 1, wherein the composition is in the form of a solid.

5. The method of claim 1, wherein the composition comprises the prodigiosin in an amount of 0.05 μg/L and further comprises the step of uniformly applying on the leaf surface of the infected plant at a rate of 15 L/mu.

* * * * *